United States Patent [19]

Briskman

[11] Patent Number: 5,592,471
[45] Date of Patent: Jan. 7, 1997

[54] MOBILE RADIO RECEIVERS USING TIME DIVERSITY TO AVOID SERVICE OUTAGES IN MULTICHANNEL BROADCAST TRANSMISSION SYSTEMS

[75] Inventor: Robert D. Briskman, North Bethesda, Md.

[73] Assignee: CD Radio Inc., Washington, D.C.

[21] Appl. No.: 434,228

[22] Filed: May 4, 1995

Related U.S. Application Data

[63] Continuation-in-part of Ser. No. 426,713, Apr. 20, 1995, abandoned.

[51] Int. Cl.$^6$ .............................. H04J 13/02; H04B 1/69
[52] U.S. Cl. ...................... 455/52.3; 375/200; 455/3.2; 455/13.2; 371/69.1; 370/320
[58] Field of Search ................................ 370/18, 109, 75; 455/3.2, 6.1, 10, 89, 188.2, 12.1, 13.2, 13.3, 18, 13.1, 54.2, 11.1, 61; 375/200, 205, 211, 214; 316/347; 371/69.1, 70, 37.1, 43, 37.4, 40.3, 61, 20.1

[56] References Cited

U.S. PATENT DOCUMENTS

| | | | |
|---|---|---|---|
| 3,825,837 | 7/1974 | Briskman | 325/456 |
| 3,836,969 | 2/1974 | Bond et al. | 455/13.1 |
| 4,291,409 | 9/1981 | Weinberg et al. | 375/1 |
| 4,291,410 | 9/1981 | Caples et al. | 375/1 |
| 4,532,635 | 7/1985 | Mangulis | 375/1 |
| 4,630,058 | 12/1986 | Brown | 342/352 |
| 4,652,884 | 3/1987 | Starker | 375/1 |
| 4,660,196 | 4/1987 | Gray et al. | 370/109 |
| 4,720,873 | 1/1988 | Goodman et al. | 455/12.1 |
| 4,801,940 | 1/1989 | Ma et al. | 342/359 |
| 4,823,341 | 4/1989 | Rosen | 455/12.1 |
| 4,831,619 | 5/1989 | Rosen | 455/12.1 |
| 4,879,711 | 11/1989 | Rosen | 370/75 |
| 4,901,307 | 2/1990 | Gilhousen et al. | 375/1 |
| 4,943,808 | 2/1990 | Dulck et al. | 455/13.1 |
| 5,017,926 | 5/1991 | Ames et al. | 342/357 |
| 5,036,523 | 7/1991 | Briskman | 375/1 |
| 5,073,900 | 12/1991 | Mallinckrodt | 375/1 |
| 5,093,839 | 3/1992 | Kohno et al. | 375/1 |
| 5,126,748 | 6/1992 | Ames et al. | 342/357 |
| 5,148,452 | 9/1992 | Kennedy et al. | 375/1 |
| 5,153,598 | 10/1992 | Alves, Jr. | 375/1 |
| 5,175,557 | 12/1992 | King et al. | 375/1 |
| 5,203,018 | 4/1993 | Hirose | 455/61 |
| 5,233,626 | 8/1993 | Ames | 375/200 |
| 5,239,670 | 8/1993 | Schwendeman et al. | 455/13.1 |
| 5,274,840 | 12/1993 | Schwendeman | 455/13.1 |
| 5,278,863 | 1/1994 | Briskman | 375/200 |
| 5,283,780 | 2/1994 | Schuchman et al. | 370/50 |
| 5,303,393 | 4/1994 | Noreen et al. | 455/3.2 |
| 5,319,673 | 6/1994 | Briskman | 375/200 |
| 5,433,726 | 7/1995 | Horstein et al. | 1/100 |
| 5,485,485 | 1/1996 | Briskman et al. | 375/200 |

FOREIGN PATENT DOCUMENTS

| | | |
|---|---|---|
| 6712990 | 5/1991 | Australia . |
| 9107025 | 5/1991 | European Pat. Off. . |

OTHER PUBLICATIONS

Szu–Lin Su et al., "Time–Diversity Scheduled Retransmission Multiaccess Protocols for Satellite Networks", IEEE, Jun. 23–26, 1991.

H. Fukuchi, "Slant Path Attenuation Analysis at 20 GHz for Time–Diversity Reception of Future Satellite Broadcasting", Broadcasating Technology Section, Communications Research Laboratory, Japan, Jun. 12, 1992.

R. Briskman, "DAR Mobile Presentation", 15th Intl'l Communications Satellite Systems Conference, AIAA, Feb./Mar. 1994.

(List continued on next page.)

*Primary Examiner*—Wellington Chin
*Assistant Examiner*—Melissa Kay Carman

[57] ABSTRACT

Mobile radio receivers in a broadcasting system having more than one transmission channel sending the same programs use time diversity to prevent service outages during periods when none of the channels can be received.

44 Claims, 13 Drawing Sheets

OTHER PUBLICATIONS

EBU Technical Review, Apr. 1991, #246, Brussels BE, pp. 64–76; Galligan/Robson, "Opportunities for sound broadcasting . . . "p. 65, col. 1, line 2 –p. 66, col. 1, line 26, par 5.1–5.3.

IEEE Int'l Confer. on Communications 88, Digital Technology 12 Jun. 1988, Phila., PA, pp. 141–146; P.A. Ratliff "UHF . . . Satellite Sound . . . "; Abstract, p. 5.2.3, lines 1–50, par. 10.

IEEE Transactions on Vehicular Technology, 1,6 vol. VT–29, No. 1, Feb. 1980, pp. 87–95; T. Hattori "Theoretical Studies of a Digital Radio Paging System . . . ", Abstract, par. 1.

FIG. 6

SATELLITE RECEIVED TRANSMISSIONS AT MOBLE RECEIVER
(EACH DATA BLOCK ONE SECOND LONG)

SATELLITE ONE — UNDELAYED SATELLITE TRANSMISSION

| 3 | 4 | 5 | 6 | 7 | 8 | 9 | 10 | 11 | 12 |

SATELLITE TWO — TWO SECOND DELAYED SATELLITE TRANSMISSION

* | 1 | 2 | 3 | 4 | 5 | 6 | 7 | 8 | 9 | 10 |

SATELLITE ONE TRANSMISSION — DELAYED TWO SECONDS BY RECEIVER

* | 1 | 2 | 3 | 4 | 5 | 6 | 7 | 8 | 9 | 10 |

→|1 SEC|←
 DATA
 BLOCKS

ASSUMED 2 SECOND DUAL BLOCKAGE OUTAGE

REAL TIME

| 1 | 2 | 3 | 4 | 5 | 6 | 7 | 8 | 9 | 10 |

MOBILE RECEIVER OUTPUT TO PROGRAM PRESENTATION DEVICE

*THESE ARE THE TWO CHANNELS USED BY THE RECEIVER FOR DATA BLOCK SELECTIONS

\* PSEUDO-NOISE CODE 1 IS ORTHOGONAL TO PSUEDO-NOISE CODE 2

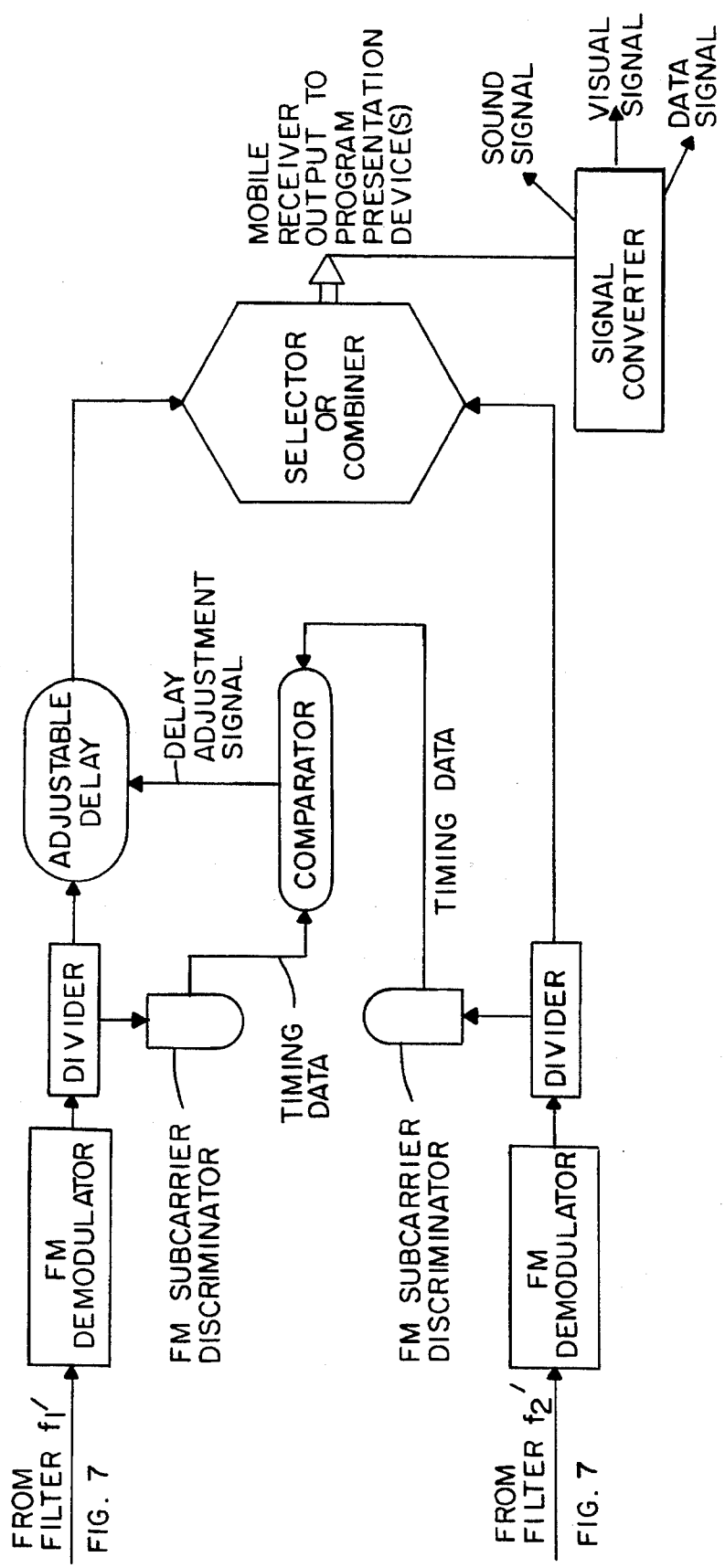

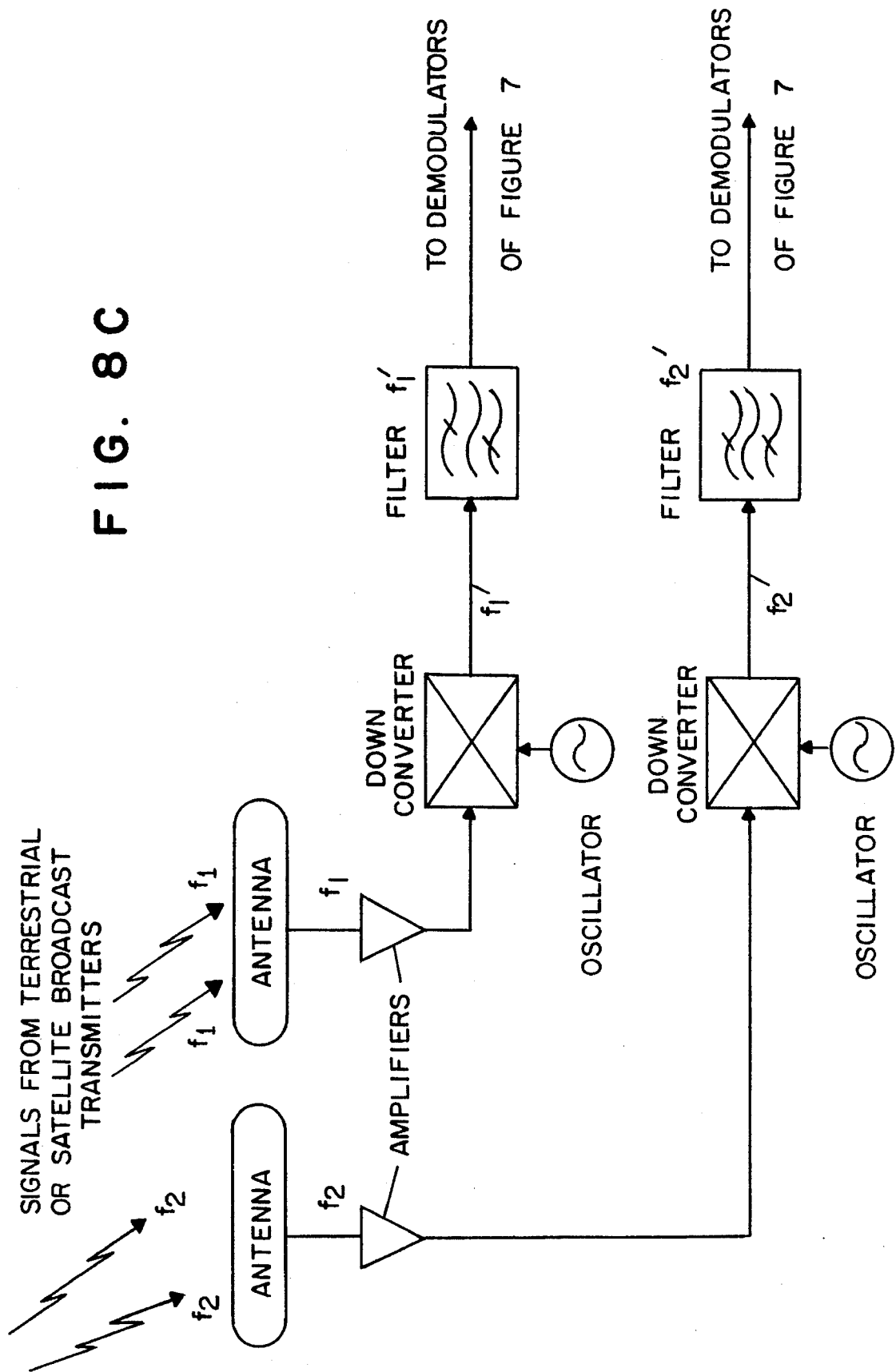

MOBILE RADIO RECEIVERS USING TIME DIVERSITY TO AVOID SERVICE OUTAGES IN MULTICHANNEL BROADCAST TRANSMISSION SYSTEMS

This application is a continuation-in-part of U.S. patent application Ser. No. 08/426,713, filed Apr. 20, 1995, entitled "MOBILE RADIO RECEIVERS USING TIME DIVERSITY TO AVOID SERVICE OUTAGES IN MULTICHANNEL BROADCAST TRANSMISSION SYSTEMS" by Robert D. Briskman, now abandoned.

BACKGROUND OF THE INVENTION

Broadcasting of television, radio, data and other forms of communications to receivers on mobile platforms using radio frequencies in the range from approximately 1–40,000 MHz suffer from transmission service outages. These transmission outages prevent the mobile user from receiving the broadcast and, if enough occur, create an unacceptable service. These outages are generally caused by multipath fading and reflection of the transmission path, physical blockage between the transmitter and receiver and interference to the mobile receiver from co-frequency transmitters other than the intended one.

Radio frequency transmission systems are subject to multipath fading which is caused by reflections of the desired signal from objects far from the mobile receiver such as mountains and from objects close to the mobile receiver such as a passing truck or large buildings. These reflections can either be specular or diffuse but are received along with the desired signal. Since the reflections are mostly out-of-phase with the desired signal, they either tend to cancel the desired signal or add to the receiver noise or both. When the cancellation and/or noise become sufficient with respect to the desired signal, a service outage occurs. See *Reference Data for Engineers*, 8th Edition, Prentice Hall, 1993, pp 46–10 for more details. Physical blockage between the transmitter and receiver is typically caused by the mobile receiver passing through tunnels, under overpasses or by close buildings and trees. During these blockage periods, whose durations are a function of the obstruction size/orientation and of the mobile receiver platform's speed, the desired signal is not available and an outage results.

Radio frequency broadcasting to mobile receivers is currently being implemented for satellite digital audio radio systems (see *Report and Order*, Federal Communications Commission, GEN Docket No. 90-357, Released Jan. 18, 1995 for more details) and has been used for many years for terrestrial radio including recently the inclusion of auxiliary digital data along with the audio program. It is possible in designing a radio broadcasting system to incorporate two or more transmission channels which transmit the same program information. Such multi-transmission channels may be provided for other purposes. Examples are transmission systems using spatial or frequency diversity for mitigating multipath. Alternatively, a multichannel transmission system can be purposely built to utilize time diversity. Hereafter the specification refers only to a two channel broadcast transmission system for simplicity. However, the same methods and apparatus described subsequently for two channel broadcast transmission systems are effective for three or more channel broadcast transmission systems.

The invention uses two transmission channels to provide time diversity for mitigating service outages from multipath, physical blockages and interference in mobile broadcast receivers. Each channel contains exactly the same data (e.g., program material). The program material in one of the channels is delayed at its origination source by a predetermined amount with respect to the second channel. The length of the delay is determined by the duration of the service outage which is to be avoided. At the mobile receiver, the transmission channel arriving first (i.e., with earlier data being the channel whose data were not delayed at its origination) is delayed using a storage type delay whose duration is the same as the duration of the delay in the data introduced at the origination point. The two received program channels are then combined or the program material in the two channels progressively selected by the receiver circuitry. The output of the combiner or selector in the mobile receiver always provides a time-ordered stream of all the program data even if there was a service outage in both transmission channels for a period equal to or less than the predetermined amount of delay introduced at the program origination point(s).

This invention is, in part, related to inventions disclosed and claimed in U.S. Pat. No. 5,278,863 which issued on Jan. 11, 1994 and U.S. Pat. No. 5,319,673 which issued on Jun. 7, 1994. Both patents are entitled "RADIO FREQUENCY BROADCASTING SYSTEMS AND METHODS USING TWO LOW-COST GEOSYNCHRONOUS SATELLITES". The contents of these two patents are incorporated herein by reference as though fully set forth here.

SUMMARY OF THE INVENTION

The invention relates to mobile radio receivers for broadcasting systems in which two or more transmission channels are used to send the same information. The apparatus and methods of the invention use time diversity to avoid service outages for a predetermined time duration. Examples of such outages are those caused by physical blockage of the transmissions between the broadcast center(s) and the mobile receivers, or by lack of sufficient received signal strength at the mobile receivers due to multipath fading, or by external interference preventing reception of the desired transmissions. The apparatus and methods of this invention delay one of the transmissions at its point of origin with relation to the second transmission by a desired predetermined amount of time to avoid or minimize service outage. In preferred embodiments, this time delay is in the range of about 1 second to about 5 minutes, or less.

The mobile receivers are designed to receive both transmission channels. The receivers delay the earlier arriving transmission (determined from a priori knowledge of which transmission was not delayed at origination, or from time header data in the transmission, or from other transmission characteristics specifically inserted for this purpose) by the predetermined amount of time using some form of storage delay circuitry or device. The transmission internally delayed in the receiver, and the other received transmission, which had been delayed at its origination point, are applied in the mobile receiver to a comparison circuit, typically one that either selects the transmission which is available, or combines the two transmissions when one or both are above an acceptable service threshold. The combining method results in twice the signal being available when no service outage conditions exist. The resultant signal out of the selector or combiner is an unbroken, continuous stream of the original broadcast data (e.g., program material) for use by the mobile receiver operators, even though both transmissions had not been receivable during the predetermined dual outage avoidance period. If the transmissions contain several different programs multiplexed together, and if it is desired to avoid dual outage on only the program being played by the receiver, the mobile receiver can be configured to apply the internal delay after the demultiplexer for the selected program.

The recovered signal at the mobile receiver output is an exact replica of the original broadcast transmission, despite the dual outage occurrence, but is delayed in real time from the time of origination to the time available at the output of the selector/combiner by the predetermined dual outage avoidance period. For one-way broadcast services, this real time delay poses no technical, operational or service problems. The duration of the predetermined dual outage avoidance period is preferably chosen to be longer than the expected multipath fades and the blockage outages caused by obstructions. For blockage outages, this avoidance period preferably exceeds the average lengths of time such outages are expected to persist at the mobile receiver platforms. The duration of the blockage outages is a function of platform speed.

The delay storage device in the mobile receiver can take many forms. For digital transmissions, a buffer shift register is preferred. Since the storage function is sequential, random access to the stored data is not required. As an alternative, the delay storage device could be a relatively inaccurate bulk storage element followed by a delay synchronizer. The synchronizer accurately adjusts the transmission to be delayed so that its time alignment is identical to the other received transmission.

A mobile receiver using time diversity can operate within a broadcast system where the origin for the two transmissions is the same point or different points, and where the transmitter(s) are collocated or remote. The simplest configuration is a single origination and single transmitting facility. For example, two transmissions may be sent from the same transmitting facility at different radio frequencies, such as by terrestrial broadcast transmitters or satellite broadcast transmitters as shown in FIGS. 1 and 2, or at the same frequency using intertransmission isolation techniques such as code division multiple access (CDMA) or cross polarization. Alternatively, a broadcast channel operating at a single radio frequency can be divided in half to create two transmission channels from a single transmission channel. One way to accomplish this digitally is to allocate half the transmitted bits to one radio broadcast signal and half to the other radio broadcast signal, alternating between the two on a bit basis or block basis, for example, by time division multiplexing. Two ways to accomplish this in an analog scheme are: (a) use of two subcarriers or (b) use of frequency division multiplexing. In any channel division scheme, the resulting broadcast capacity in terms of broadcast power, or number of programs broadcast, is half what the capacity would be without division.

In broadcast systems employing spatial diversity, as shown in FIG. 3, two transmission paths already exist. It is only necessary to delay one transmission with respect to the other to achieve time diversity. Where two non-collocated transmitters are used, the mobile receivers also have a differential delay between the two received signals, except where a receiver is equidistant from the two transmitters. The receiver easily compensates for this differential delay since the correct amount of time diversity delay is predetermined and the differential delay is normally small. Differential delays also arise where the origin points for the two transmissions are physically different. For such delays, further mechanization is required at the transmitters to delay accurately one transmission with respect to the other, and to maintain this delay precisely.

BRIEF DESCRIPTION OF THE DRAWINGS

The apparatus and methods of this invention can better be understood by reference to the drawings, in which:

FIG. 6 provides an illustrative timing diagram of the two transmissions as originated in the broadcast system and after delay processing in a mobile radio receiver configured for time diversity as shown below in FIG. 7.

FIG. 8A shows one specific configuration in a mobile radio receiver where the broadcast system is assumed to transmit standard FM analog modulation for the program, accompanied by a subcarrier carrying a timing signal. The timing signals permit the comparator in the mobile radio receiver to align the received $f_1'$ and $f_2'$ transmissions for achieving time diversity operation as shown in the block diagram.

FIG. 8B shows how the time diversity delay in the mobile radio receiver can be applied only to the specific program selected by the mobile user.

FIG. 8C shows a mobile radio receiver wherein the radio frequency portion contains a first antenna, amplifier, downconverter and filter for frequency $f_1$ and a second antenna, amplifier, downcoverter and filter for $f_2$. This configuration allows each of the previously mentioned receiver elements to be narrowband (i.e., just wide enough to pass their respective transmission), and is particularly effective when $f_1$ and $f_2$ are far apart in the radio frequency spectrum. The configuration in FIG. 8C is also useful if one radio frequency is used for broadcasting both programs, and isolation between the two transmissions is achieved using cross polarization. In such a case, one of the receiving antennas operates either right hand circular or vertically polarized, and the other, left hand circular or horizontally polarized.

FIG. 8E shows that the comparator uses these headers to achieve precise alignment of the two program digital streams. If the headers are not aligned at the start of each data block, a clock is started for the length of the time offset, and the clock output is converted to a correction signal for the adjustable delay. FIG. 8E also shows that, for long service outage avoidance periods, the majority of the delay need not be adjustable. This allows more economical delay devices to be used because bulk, fixed delay storage works satisfactorily for most of the required delay period followed by a smaller adjustable delay for precise time alignment.

DESCRIPTION OF PREFERRED EMBODIMENTS

Two preferred embodiments are described. The first is a local area terrestrial broadcast system, and the second is a national coverage satellite broadcast system.

Figure 1:
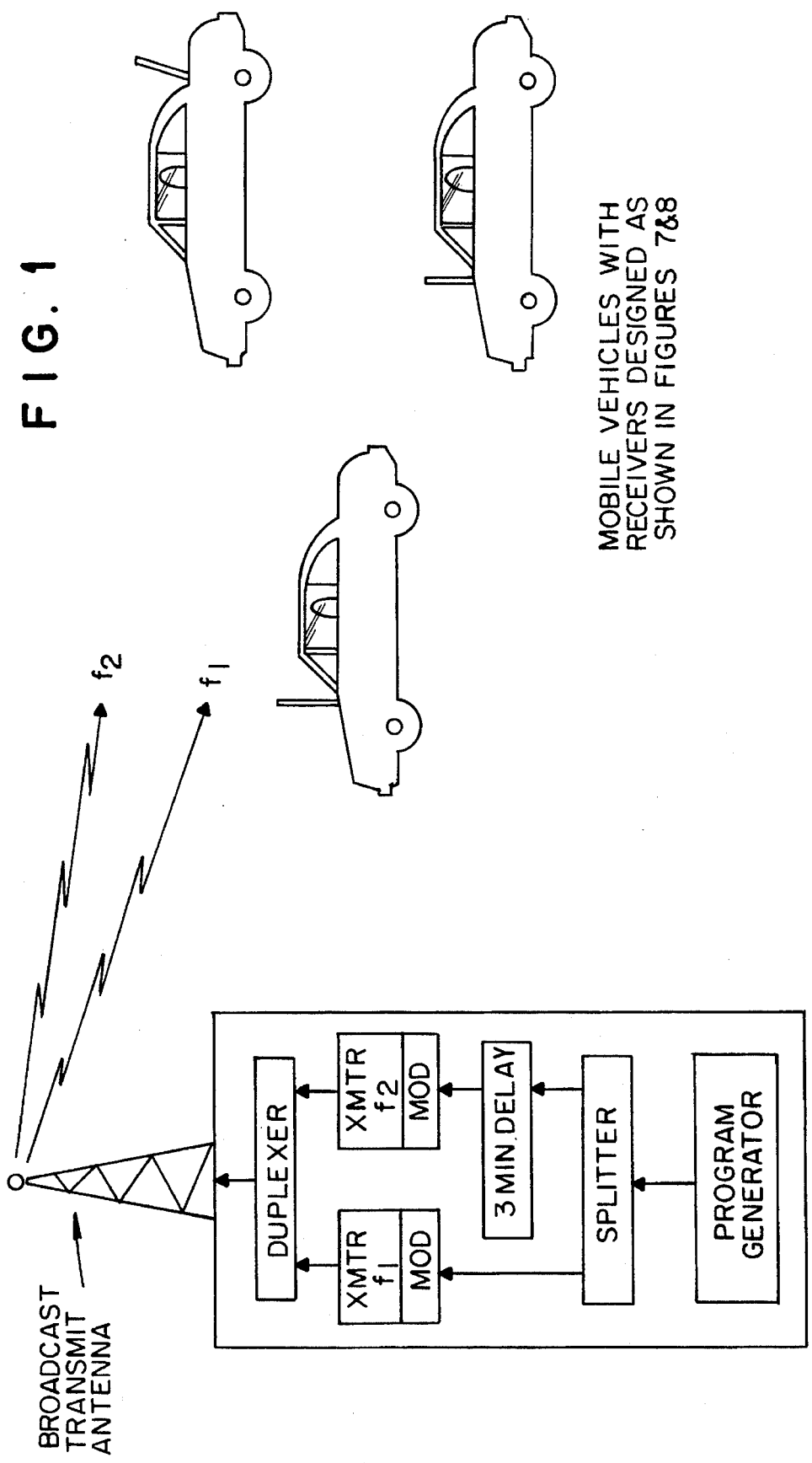
FIG. 1 shows a mobile radio receiver in a terrestrial broadcast system using a central origination and transmitting facility configured for time diversity. The program output signal is divided into two identical parts by the splitter. This program output signal could be audio, such as voice or music, or data, or both in multiprogram broadcasts using multiplexers. The program material could be in analog or digital form. One of these two parts goes directly to a modulator/transmitter, and is broadcast from the antenna at frequency $f_1$. The second part goes through a device which delays it with respect to the first part by, for example, 3 minutes. The second part then goes to a modulator/transmitter, and is broadcast from the antenna at frequency $f_2$. The two frequencies $f_1$ and $f_2$ are received by the mobile radio receivers everywhere within the coverage area, and the operation of these receivers is described below with reference to FIG. 7.
Figure 2:
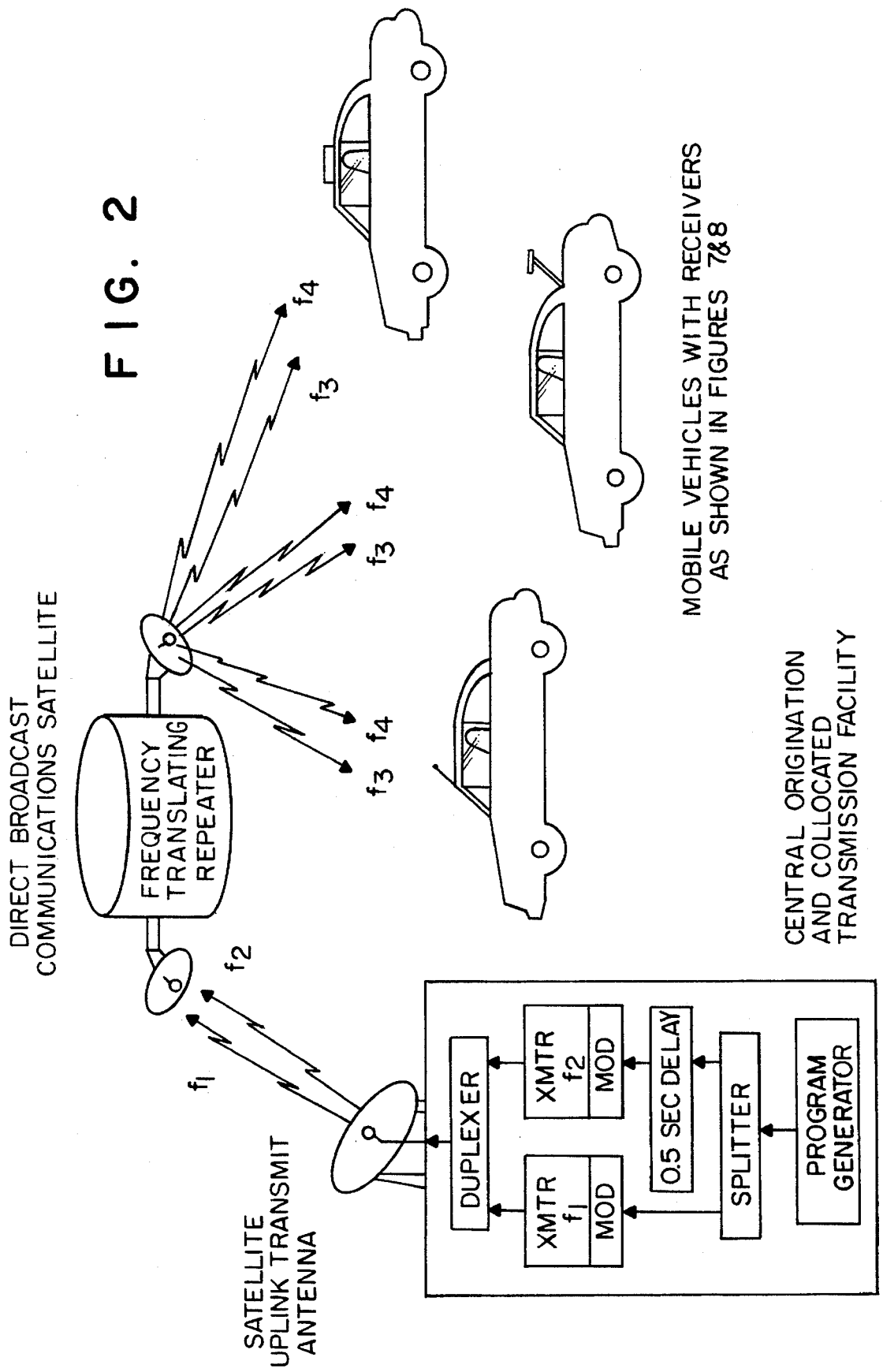
FIG. 2 shows a mobile radio receiver in a single satellite broadcast system using a central origination and transmitting facility configured for time diversity. The technical operation at the central origination facility is the same as described for FIG. 1 except the delay has been chosen for illustration to be 0.5 seconds, and the antenna transmitting frequencies $f_1$ and $f_2$ is an uplink satellite type. The two transmissions are received by a satellite, which is assumed to be carrying a frequency translation repeater. The repeater receives and amplifies $f_1$ and $f_2$, translates them to the desired downlink frequencies, herein designated $f_3$ and $f_4$, amplifies $f_3$ and $f_4$, and transmits them to the earth through a satellite antenna whose beamwidth encompasses the desired geographical service area. The mobile radio receivers in the service area receive $f_3$ and $f_4$. The operation of these receivers is described below with reference to FIG. 7.
Figure 4:
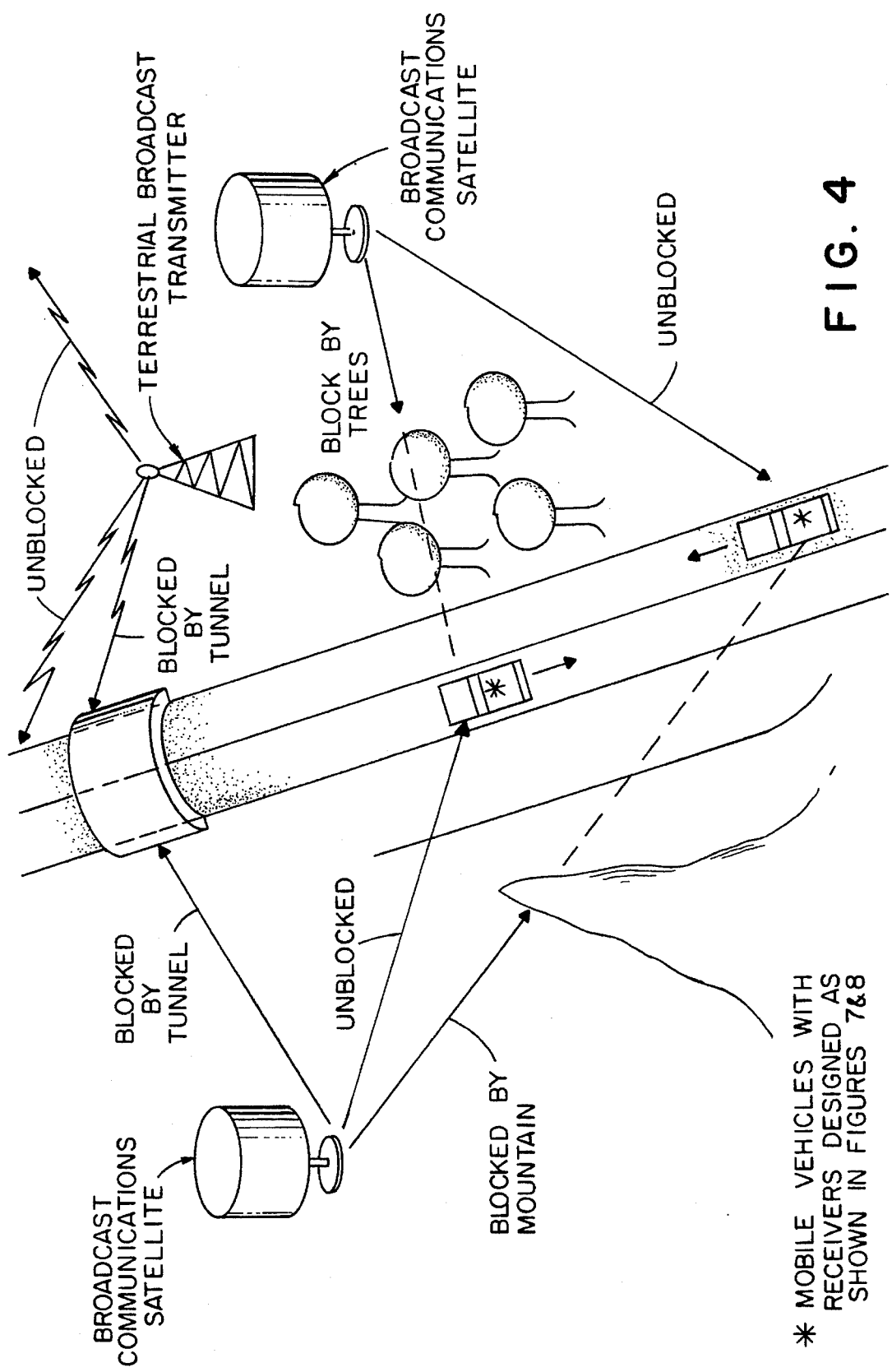
FIG. 4 illustrates service blockage outage of mobile radio receivers in a broadcast system. As shown, service outages from blockage affect both terrestrial and satellite broadcast systems.
Figure 5:
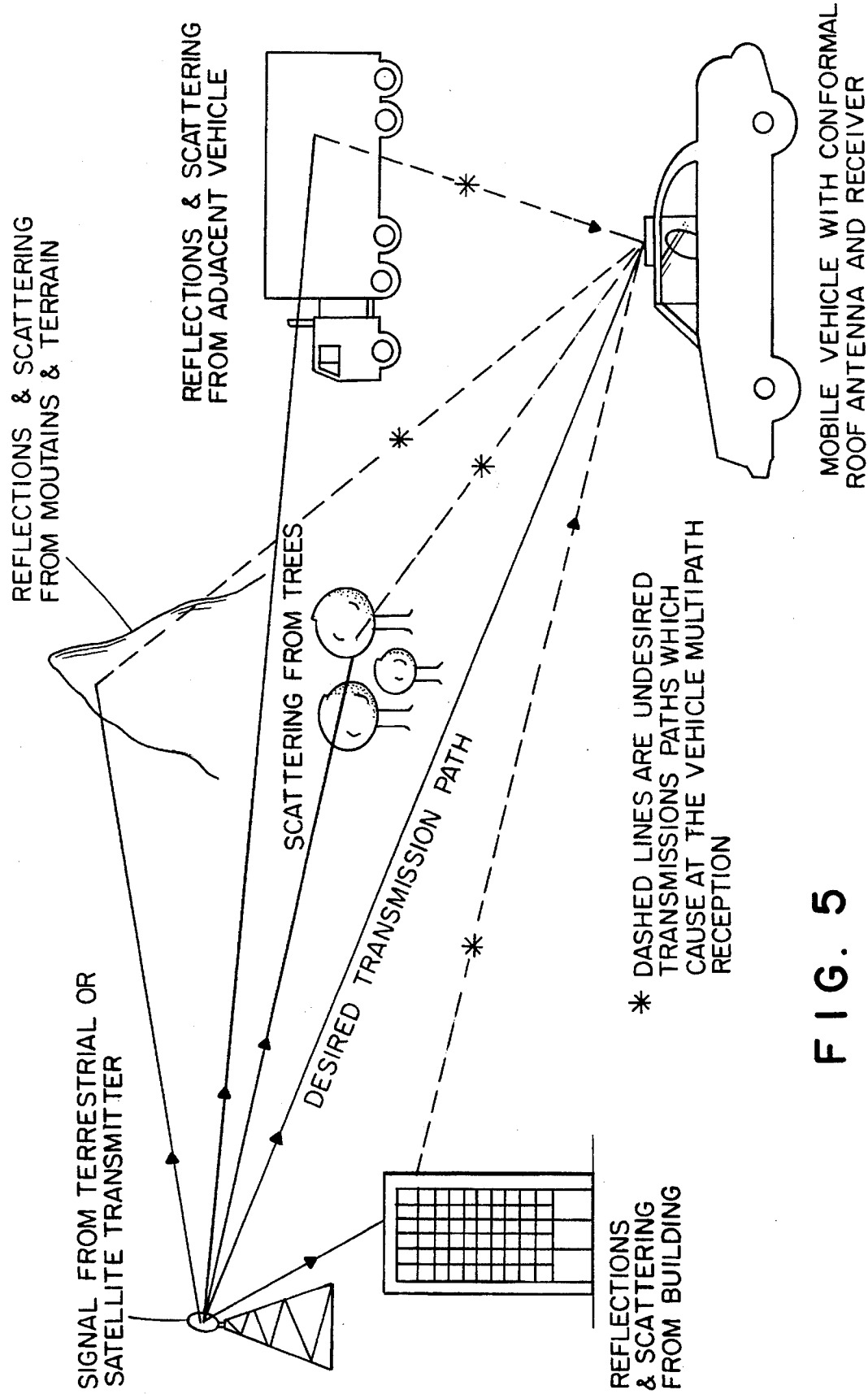
FIG. 5 illustrates the existing causes of multipath fading in mobile radio receivers which affects both terrestrial and satellite broadcast systems. As shown, the exiisting mobile receiver has the signal in a desired transmission path corrupted by the same signal arriving later through specularly or diffusely reflected transmission paths.

The configuration of the local area terrestrial broadcast system, shown in FIG. 1, includes a central program origination facility in proximity to a radio frequency transmitter. To employ time diversity, the transmitter has been constructed so that the program material can be broadcast at two radio frequencies rather than one as is currently done. It is assumed for purposes of illustration that the transmission is standard frequency modulated (FM) program material with one of the FM subcarriers modulated with a time code, and that a three minute service outage avoidance period has been chosen. The service outages to the mobile radio receivers can be caused by blockages as illustrated in FIG. 4, or by multipath fading as illustrated in FIG. 5, or by radio interferers, or by combinations thereof. The program information sent on frequency $f_2$ is delayed by three minutes with respect to that on frequency $f_1$ at the transmitter before transmission.

Figure 7:
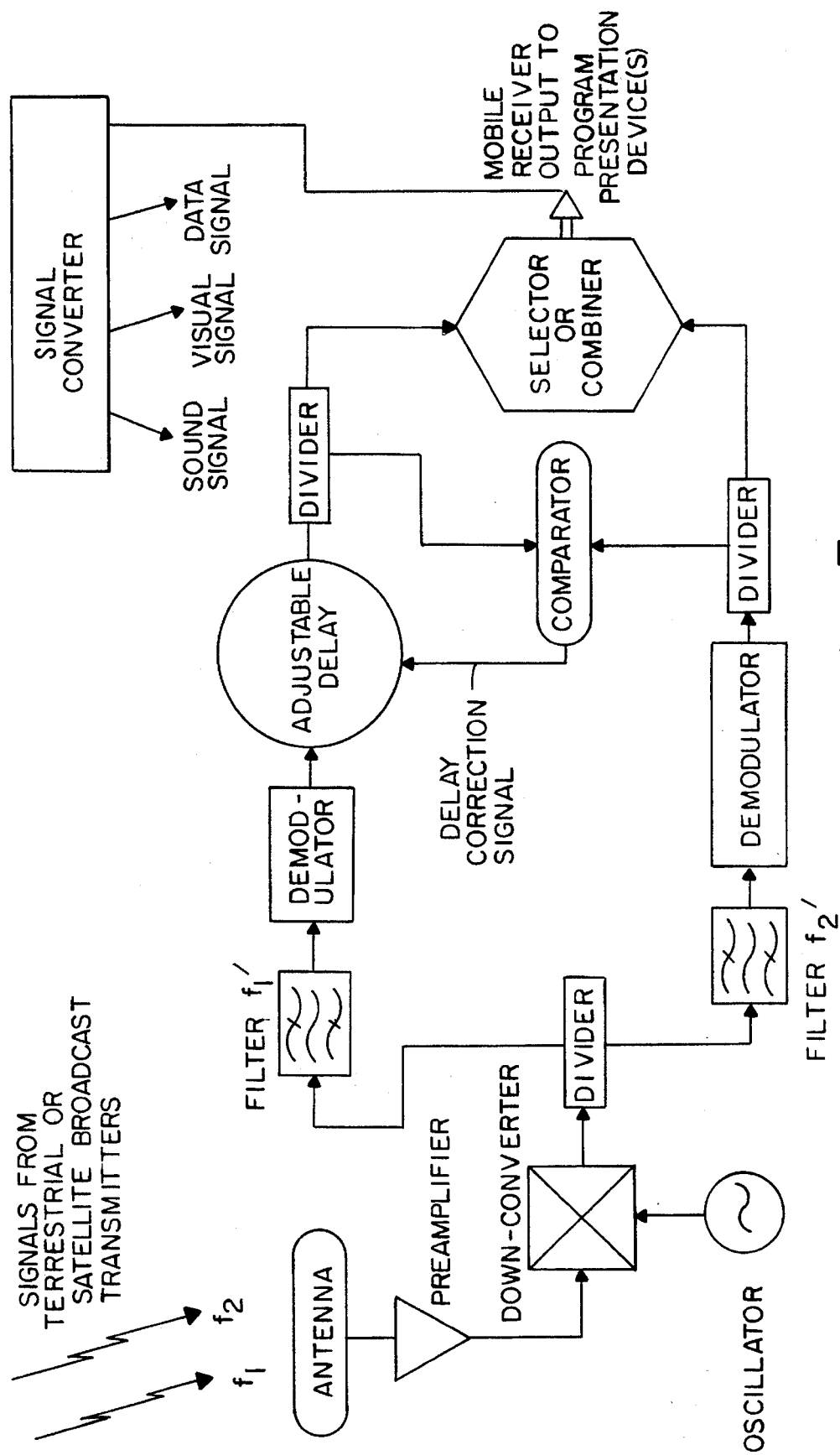
FIG. 7 shows a generalized block diagram of a dual frequency mobile radio receiver configured for time diversity operation. The configuration is compatible with the broadcast systems described in FIGS. 1 and 2. The mobile receiver contains an antenna whose bandwidth and beamwidth are designed to receive both $f_1$ and $f_2$. The received transmissions are amplified in a preamplifier and downconverted to a convenient frequency for demodulation. The downconverted transmissions $f_1'$ and $f_2'$ are filtered and demodulated. The demodulated $f_1'$ is delayed by the same time period that $f_2$ was delayed at the origination facility (see FIGS. 1 or 2). The $f_1'$ delay is accomplished using an adjustable delay whose adjustment is dynamically controlled by a comparator which is designed to keep $f_1'$ after delay in synchronism with $f_2'$. After this has been accomplished, $f_1'$ and $f_2'$ are fed to a selector or combiner whose timing diagram is illustrated in FIG. 6 and whose operation is described below. The output of the selector or combiner is used by the program presentation device(s) in the mobile receiver such as a digital to analog converter followed by stereo audio amplifiers and speakers. Although the adjustable delay is shown at baseband following the demodulator, the delay could also be inserted at intermediate or radio frequency portions of the receiver.

Mobile radio receivers in various automobiles and trucks throughout the local area served by the previously described FM radio station are designed for time diversity operation. They receive both transmitted frequencies $f_1$ and $f_2$, demodulate the FM modulated signals using known techniques, and receive the program material and the time code signals from the subcarriers. The program material received on frequency $f_1$ is delayed in the receiver by three minutes, using a comparison of the time codes to make the final delay adjustment precise. The program material from the now-delayed $f_1$ received signal, and the program material from the $f_2$ received signal are applied to a selector or combiner circuit. The selector circuit chooses the program from $f_1$ or $f_2$ depending on availability, and in a continuous sequence, based on the time code. If a combiner is used, the two program signals are continuously summed, provided one or both are above a predetermined threshold level. In any case, the output from the selector/combiner is the continuous program material which has no discontinuities, even during times that the mobile radio receivers were unable to receive both transmission for up to three minutes. The generalized block diagram of the radio receiver is shown in FIG. 7, and a specific configuration is illustrated in FIG. 8A.

Figure 3:
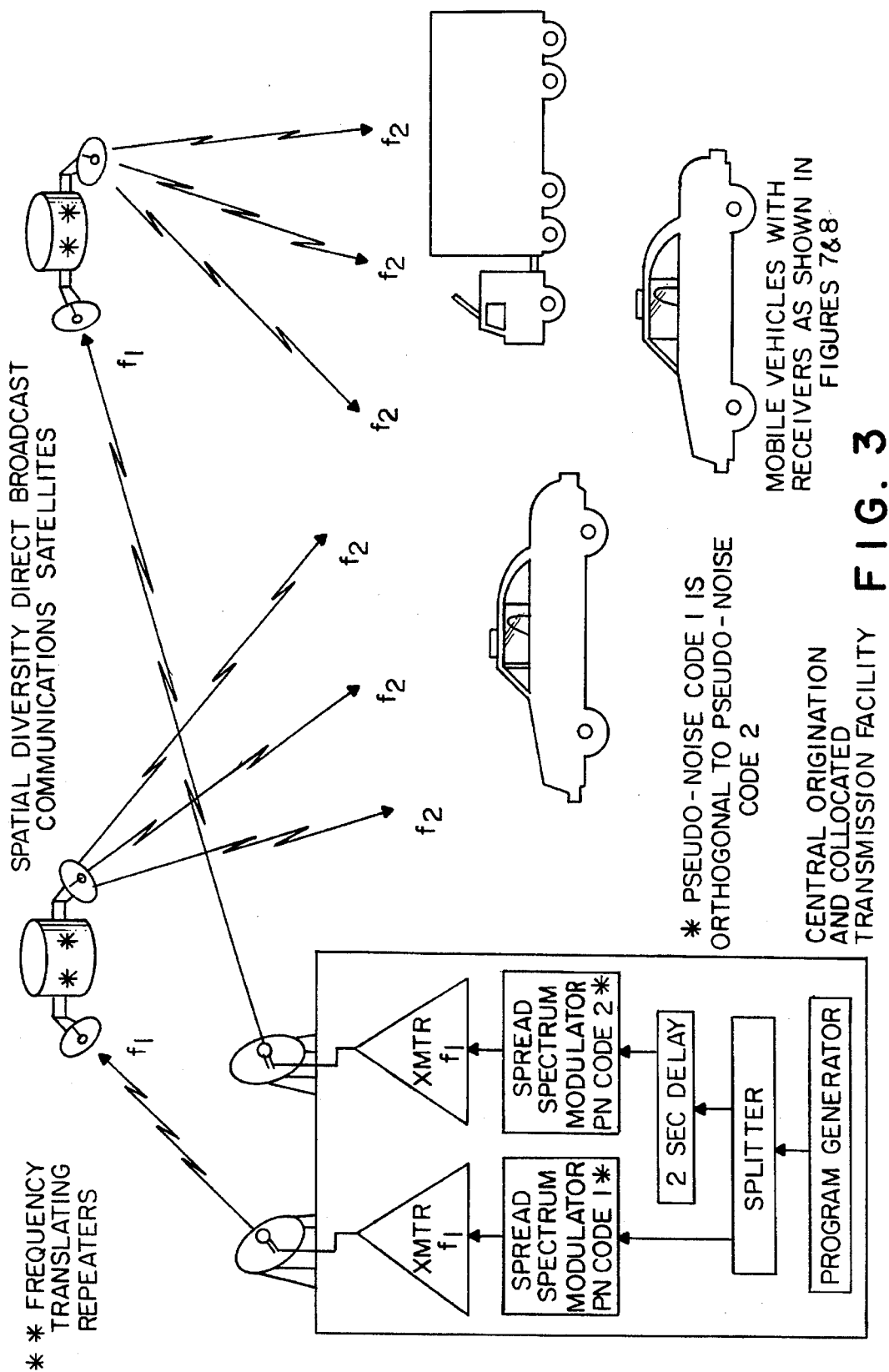
FIG. 3 shows a mobile radio receiver in a multi-satellite broadcast system using a central origination facility configured to provide both spatial and time diversity. For simplicity, only two satellites are shown. The technical operation at the central origination facility is similar to FIG. 2 with three differences. One difference is that a 2-second delay is used for illustration. A second difference is that two uplink satellite antennas are used. Third, the two program signals are modulated using spread spectrum with two specific pseudo-noise codes which are orthogonal to each other. This allows both program signals to be transmitted at the same radio frequency, and shows that time diversity operation is feasible with a wide range of modulation types. The two satellites receive the transmissions at frequency $f_1$ and, identically to the satellite in FIG. 2, retransmit $f_1$ at translated frequency $f_2$ to the desired geographical service area. The mobile radio receivers in the service area receive the $f_2$ transmissions with the orthogonal pseudo-noise codes. Their technical operation is described below with reference to FIG. 8. Since both satellites carry the same program, spatial diversity is also available in this illustration. Spatial diversity mitigates service outages from blockage and multipath which includes situations where the blockage of one satellite is longer than the service outage avoidance period provided in the mobile receiver, where the mobile receiver is slowly moving or stopped, etc.

The second embodiment is a satellite radio broadcast system providing national coverage. For illustration purposes, a two-satellite broadcast system is described as shown in FIG. 3 where the two satellites are used to provide spatial diversity. Spatial diversity is also useful for mitigating multipath and blockage service outage, and is particularly effective for slow or stopped mobile receivers. In this embodiment, program materials are assumed to be transmitted in digital form, divided into data blocks each having a header which includes, among other information, a sequential block number. This is a normal digital data transmission format based on efficient communications coding and information handling. Since spatial diversity was already employed in the illustrated system, no additional transmission facilities are required to implement time diversity in the origination, transmission or radio reception. The mobile radio receivers are already capable of two channel operation and, in this case, require primarily the addition of the delay storage device.

For this second embodiment, the program material is sent from the originating center through the uplink facilities to the two satellites. The program material sent to the satellite on the right side of FIG. 3 is delayed at the program origination facility by the desired service outage avoidance time period, here assumed to be 2 seconds, with the digital data block previously described assumed to be 1 second in length. For this embodiment, the two transmissions are assumed to be sent at the same radio frequency using code division multiple access (CDMA), a form of spread spectrum modulation which is one method of providing the isolation needed between the two transmissions in spatial diversity systems. However, time diversity also works well if the isolation in a spatial diversity system was achieved by using two different radio frequencies, or by using cross-polarized radio transmissions from the satellites.

Figure 8:
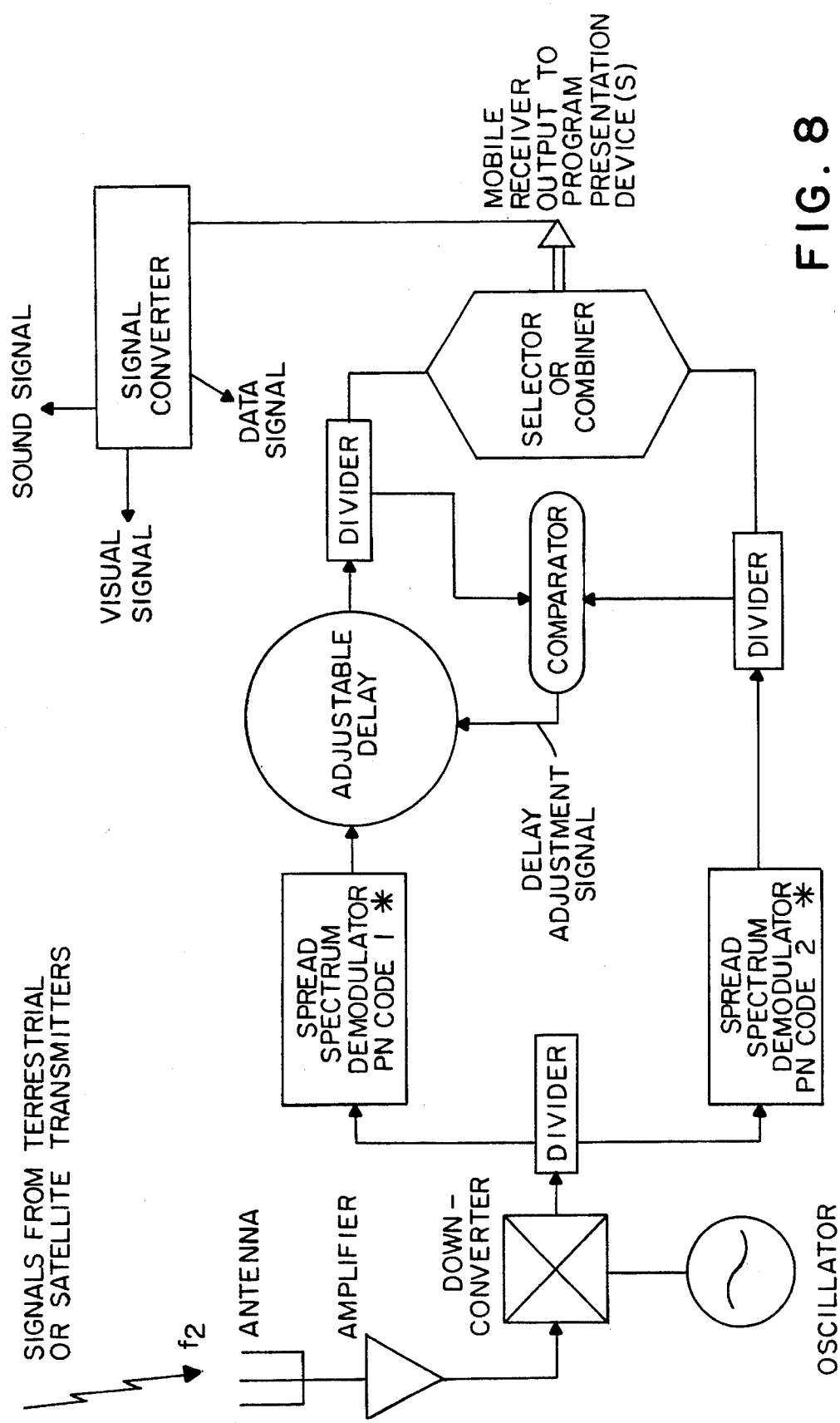
FIG. 8 shows a generalized block diagram of a single frequency mobile radio receiver configured for time diversity operation. The configuration is compatible with the broadcast system described in FIG. 3. It operates identically with that described in FIG. 7, except that the two demodulators are designed for spread spectrum demodulation with isolation between the two transmissions obtained by code division multiple access (CDMA) using two orthogonal pseudo-noise codes.
Figure 8B:
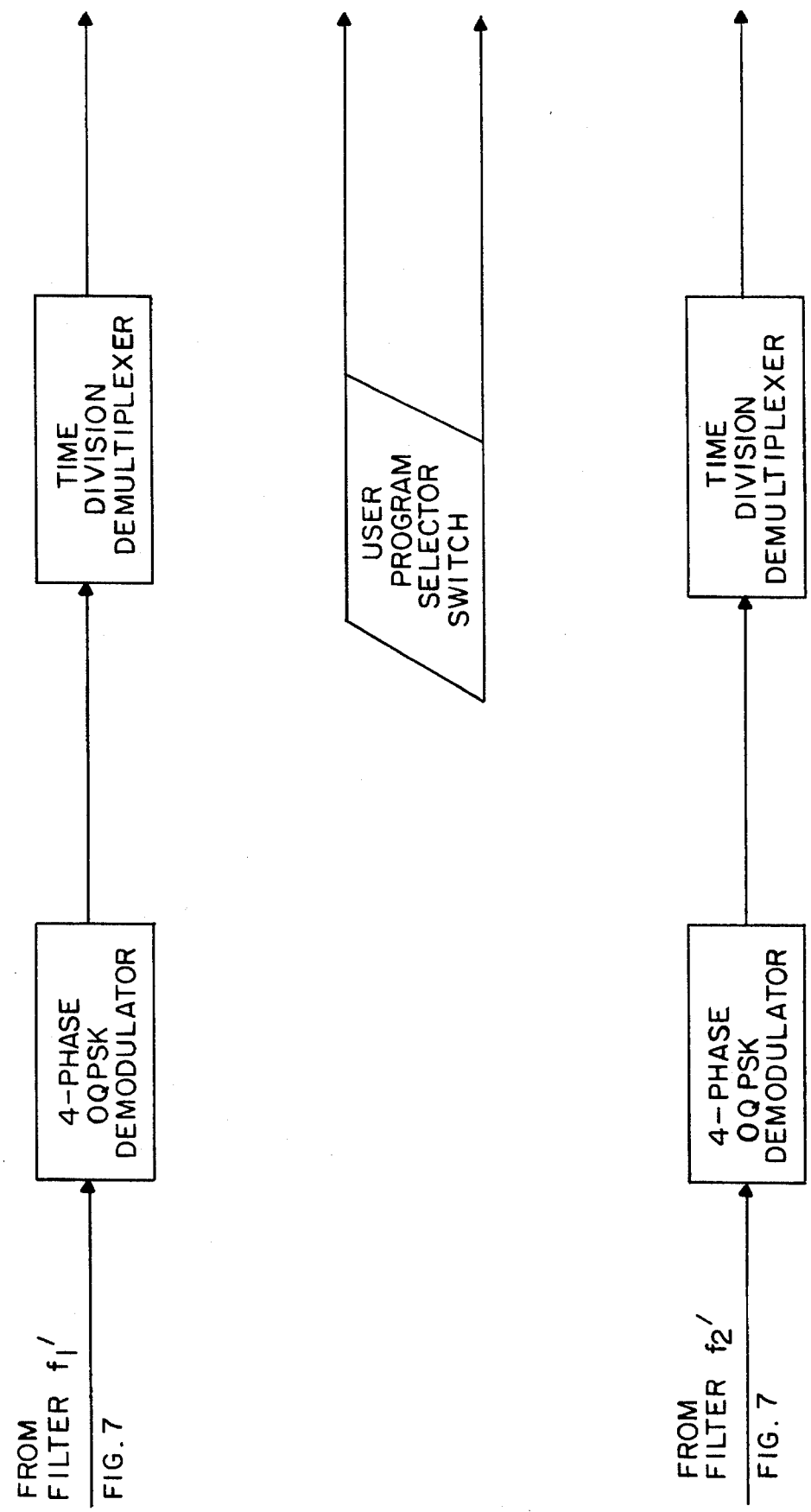
FIG. 8B shows a configuration similar to FIG. 7, but here the broadcast system transmits 4-phase offset quadrature phase shift keyed (OQPSK) digital modulation with several programs multiplexed using time division multiplexing.
Figure 8D:
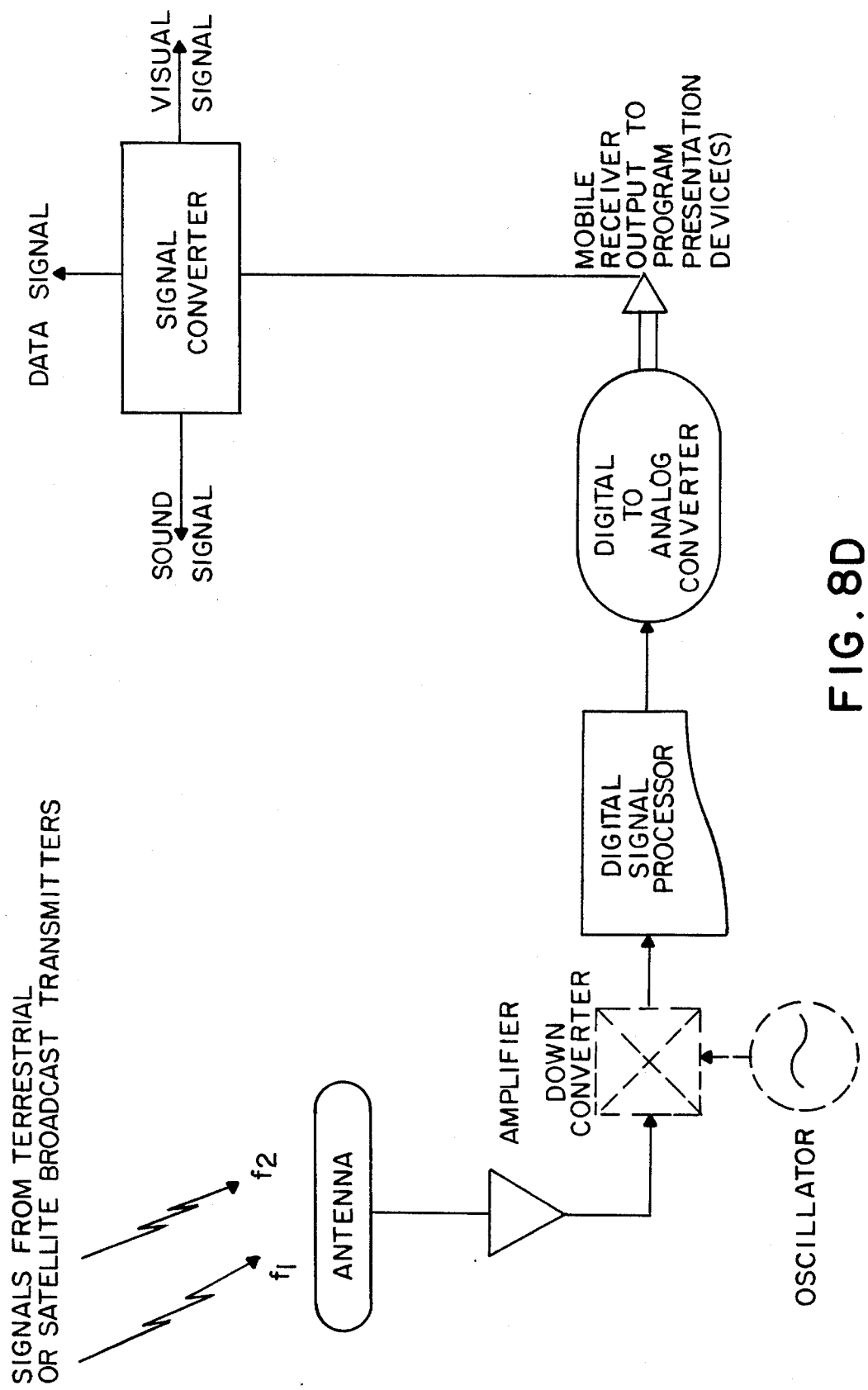
FIG. 8D shows a mobile radio receiver design using digital signal processing (DSP). The DSP device employs a combination of digital hardware and software algorithms to filter, demodulate, delay and process the received transmissions including, depending on the transmission radio frequency and economics, down conversion as shown in the diagram by the dotted lines.
Figure 8E:
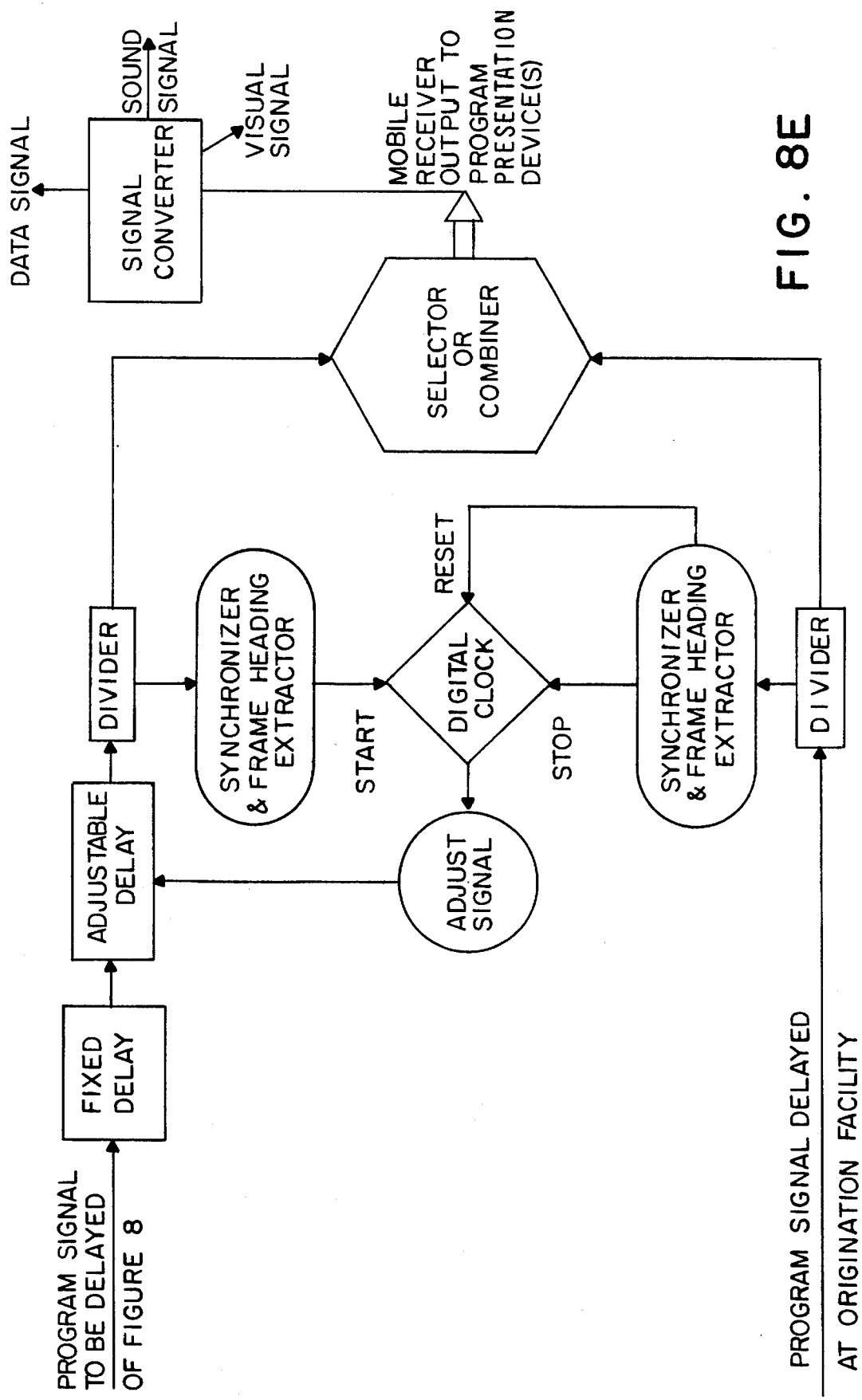
FIG. 8E shows an embodiment of the adjustable delay and comparator circuits shown in other figures. The design assumes digital transmission of the broadcast programs with the data in blocks containing identifying headers.

The mobile radio receivers receive and demodulate both transmissions. The generalized block diagram of the radio receiver is shown in FIG. 8. The receiver delays the transmission received from the satellite on the left side of FIG. 3 by the predetermined service outage period, in this case 2 seconds. The receiver determines which transmission is from which satellite by the particular pseudo-noise code used in the CDMA, and can precisely align the two transmissions using synchronization data in the data block headers. The two received transmissions are then sent to the selector/combiner circuit.

The operation of the mobile radio receiver using time diversity is illustrated by the timing diagram of FIG. 6. The diagram shows the two signals received from the satellites at a particular mobile receiver versus real time. The broadcast signal has been digitized (e.g., analog music to digital), and placed in data blocks at the source for processing and handling since, preferably, signal compression, multi-source multiplexing, coding and interleaving would be performed before transmission to the satellites. Each data block would have a digital block sequential identification number in its header which is shown in the diagram as an Arabic number ascending with time.

It is assumed that a dual transmission outage of two seconds duration occurs as shown in the diagram. In real time, this means that data blocks 7 and 8 are not received from satellite one (the undelayed satellite transmission), and data blocks 5 and 6 are not received from satellite two (the delayed satellite transmission). In this example, all data blocks are 1 second long. The third line from the top of the diagram shows the satellite one transmission which has now been delayed two seconds by the mobile receiver internal delay and storage circuitry. This third line and the second line are used by the receiver selector or combiner subsystem which picks the best quality data block to output to the program user. These two lines are marked with stars and, depending on initial conditions, the output from a selector is either:

(1) Satellite two, data blocks 1, 2, 3 and 4 followed by satellite one, data blocks 5 and 6 followed by satellite two, data blocks 7, 8, 9 . . . or
(2) Satellite one, data blocks 1, 2, 3, 4, 5 and 6 followed by satellite two, data blocks 7, 8, 9 . . .

In both cases, all data blocks are recovered despite the dual transmission outage in correct real time sequence, but with a 2-second delay from real time. Alternately, the output from a combiner would be data blocks 1 through 10 with data blocks 1, 2, 3, 4, 9 and 10 at twice the amplitude of data blocks 5, 6, 7 and 8.

In this embodiment, there is an additional delay time between receiving the transmission from one satellite and the other unless the mobile receiver is equidistant from both satellites. This additional differential delay is preferably compensated by the precise alignment adjuster prior to the selector/combiner.

In all embodiments, the output of the selector/combiner feeds the normal mobile radio receiver program presentation device such as an audio detector, amplifier and loudspeakers and/or a visual display such as a Liquid Crystal Display (LCD) or facsimile and/or a data terminal such as a computer.

What is claimed is:

1. A method for substantially eliminating service outages from various causes, including physical blockage, multipath fading and electronic interference, by the transmission of at least two radio broadcast signals having frequencies in the range of about 300 MHZ to about 3,000 MHZ, and having substantially the same content to a plurality of mobile receivers for said signals comprising:

broadcasting a first radio broadcast signal to said plurality of mobile receivers;

after a time delay of sufficient length to substantially eliminate said service outages, said delay being at least about 0.5 seconds, following the broadcast of said first radio broadcast signal, broadcasting a second radio broadcast signal containing substantially the same program content as said first radio broadcast signal to said plurality of mobile receivers;

storing, in each of said mobile receivers, said first radio broadcast signal for a time period substantially the same as the time of said time delay; and outputting from each of said plurality of mobile receivers, the program contents of said first and said second radio broadcast signals by combining said first and said second radio broadcast signals for output or by selecting for output, in correct time-ordered progression, portions of said first radio broadcast signal and portions of said second radio broadcast signal.

2. The method of claim 1 wherein said two radio broadcast signals are at the same frequency with intertransmission isolation or by dividing the transmission channel.

3. The method of claim 2 wherein said intertransmission isolation technique is CDMA.

4. The method of claim 2 wherein said intertransmission isolation method is cross-polarization of the two signals.

5. The method of claim 1 wherein said two radio broadcast signals are at two different frequencies.

6. The method of claim 1 wherein said two radio broadcast signals originate from a common terrestrial transmission source.

7. The method of claim 1 wherein said two radio broadcast signals originate from a common satellite transmission source.

8. The method of claim 1 wherein said two radio broadcast signals originate from two separate satellite sources, each of said satellite sources being on a common geosynchronous orbit.

9. The method of claim 1 wherein said two radio broadcast signals originate from two terrestrial transmission sources.

10. The method of claim 1 wherein more than two radio broadcast signals are used for avoiding service outages.

11. The method of claim 10 wherein said multiple radio broadcast signals originate from multiple separate satellite sources, each of said sources being on a common geosynchronous orbit.

12. The method of claim 1 wherein said time delay is in the range of about 1 second to about 5 minutes.

13. A mobile receiver for outputting a substantially continuous, time-ordered radio broadcast signal derived from at least two radio broadcast signals having frequencies in the range of about 300 MHZ to about 3,000 MHZ, and having substantially the same program content received by said mobile receiver at two different times and stored in said mobile receiver, comprising, in said mobile receiver, a system for storing at least one of the two said radio broadcast signals, said storage system including means for delaying output of the earlier received of the two broadcast signals for a time equal to the time differential between the same program element of the first and second signal in said receiver, said delay being at least about 0.5 seconds in length, and a system for converting said signals for output as a sound, visual or data signal, whereby service outages from various causes, including physical blockage, multipath fading and electronic interference in the transmission of said at least two radio broadcast signals, are substantially eliminated.

14. The mobile receiver of claim 13 wherein the storage device comprises a buffer shift register.

15. The mobile receiver of claim 13 wherein said storage device includes buffer storage and a delay synchronizer connected to said buffer storage.

16. The mobile receiver of claim 13 wherein said storage device is applied only to a user-selected program.

17. The mobile receiver of claim 13 further comprising means for combining said two radio broadcast signals, or means for selecting for output, portions of said first received radio broadcast signal and portions of said second received radio broadcast signal when necessary to provide a time-ordered stream of all program data in said signals so that reception outage of both the first radio broadcast signal and the second radio broadcast signal does not cause interruption of a continuous time-ordered output stream of the program data in said two received radio broadcast signals.

18. The mobile receiver of claim 13 wherein said two radio broadcast signals are analog or digital, have any desired modulation, are the same or differ in frequency, and include the timing information for storage derived from the signals, inserted in the signals or carried by auxiliary channels.

19. A radio broadcast method for broadcasting signals having frequencies in the range of about 300 MHZ to about 3,000 MHZ comprising:

broadcasting a first radio broadcast signal using spread spectrum modulation from a first satellite source traveling on a geosynchronous orbit;

after a time delay of sufficient length to substantially eliminate said service outages, said delay being at least about 0.5 seconds, following the broadcast of said first radio broadcast signal, broadcasting a second radio broadcast signal using spread spectrum modulation, said second radio broadcast signal having substantially the same content and frequency as said first radio broadcast signal from a second satellite source on said geosynchronous orbit, said second satellite source being spaced from said first satellite source a predetermined number of degrees to reduce further multipath fading and to reduce further signal attenuation from physical objects in the paths of said first radio broadcast signal and said second radio broadcast signal and producing an output signal from said first radio broadcast signal and said second radio broadcast signal at a plurality of mobile receivers located at or near the surface of the earth.

20. The method of claim 19 further comprising measuring the signal strengths of said first and said second radio broadcast signals, and selecting the stronger signal from said first and said second radio broadcast signals.

21. The method of claim 19 further comprising combining said first and said second radio broadcast signals to form said output signal.

22. The method of claim 19 wherein said first and said second radio broadcast signals are modulated sufficiently to resist multipath fading.

23. A method for reducing satellite-based transmitter power in a radio broadcasting system adapted to broadcast radio broadcast signals having frequencies in the range of about 300 MHZ to about 3,000 MHZ comprising:

broadcasting on a first path a first radio broadcast signal that includes audio program information from a first satellite source traveling on a substantially geosynchronous orbit;

after a delay time of sufficient length to substantially eliminate said service outages, said delay being at least about 0.5 second, following the broadcast of said first radio broadcast signal, broadcasting on a second path a second radio broadcast signal having substantially the same content and frequency as said first radio broadcast signal from a second satellite source on said substantially geosynchronous orbit, said second satellite source and said second path being spaced from said first satellite source and said first path a predetermined number of degrees to reduce further the power needed to transmit said first and said second radio broadcast signals to a receiver at or near the earth's surface; and assembling and producing said broadcast signal as an output signal from said first radio broadcast signal and said second radio broadcast signal at a plurality of mobile receivers having at least one channel to receive said first radio broadcast signal and at least one channel to receive said second broadcast signal located at or near the earth's surface.

24. A method for reducing satellite-based transmitter power in a radio broadcasting system adapted to broadcast radio broadcast signals having frequencies in the range of about 300 MHZ to about 3,000 MHZ comprising:

broadcasting on a first path a first radio broadcast signal that includes audio program information from a first satellite source traveling on a substantially geosynchronous orbit;

after a time delay of sufficient length to substantially eliminate said service outages, said delay being at least about 0.5 seconds, following the broadcast of said first radio broadcast signal, broadcasting on a second path a second radio broadcast signal with substantially identical content from a second satellite source on said substantially geosynchronous orbit, said second satellite source and said second path being spaced from said first satellite source and said first path a predetermined number of degrees to reduce further the power needed to transmit said first and said second radio broadcast signals to the earth's surface, said second radio broadcast signal having a frequency different from the frequency of said first radio broadcast signal; and assembling and producing said radio broadcast signal as an output signal from said first and said second radio broadcast signals at a plurality of mobile receivers having at least one channel to receive said first radio broadcast signal and at least one channel to receive said second radio broadcast signal located at or near the surface of the earth.

25. A method for improving signal reception in a radio broadcast system comprising:

broadcasting on a first path a first radio broadcast signal that includes audio program information having a frequency in the range of about 300 MHZ to about 3,000 MHZ from a first satellite source traveling on a substantially geosynchronous orbit;

after a time delay of sufficient length to substantially eliminate said service outages, said delay being at least about 0.5 seconds, following the broadcast of said first radio broadcast signal, broadcasting on a second path a second radio broadcast signal with identical content having substantially the same frequency as said first radio broadcast signal or having a frequency different from the frequency of said first radio broadcast signal from a second satellite source on said substantially geosynchronous orbit, said second satellite source and said second path being spaced from said first satellite source and said first path a predetermined number of degrees to improve further the reception of said first and said second radio broadcast signals at a plurality of mobile receivers located at or near the earth's surface; and assembling and producing said radio broadcast signal as an output signal from said first radio broadcast signal and said second radio broadcast signal at said plurality of mobile receivers having at least one channel to receive said first radio broadcast signal and at least one channel to receive said second radio broadcast signal.

26. A method for reducing foliage attenuation and signal outage from radio path blockage in a radio broadcasting system adapted to broadcast signals having frequencies in the range of about 300 MHZ to about 3,000 MHZ comprising:

broadcasting on a first path a first radio broadcast signal that includes audio program information having a frequency in said range from a first satellite source traveling on a substantially geosynchronous orbit;

after a time delay of sufficient length to substantially eliminate said service outages, said delay being at least about 0.5 seconds, following the broadcast of said first radio broadcast signal, broadcasting on a second path a second radio broadcast signal with identical content having substantially the same frequency as said first radio broadcast signal or having a frequency different from the frequency of said first radio broadcast signal from a second satellite source on said geosynchronous orbit, said second satellite source and said second path being spaced from said first satellite source and said first path a predetermined number of degrees to minimize further foliage attenuation or radio path blockage; and assembling and producing said radio broadcast signal as an output signal from said first radio broadcast signal and said second radio broadcast signal at a plurality of mobile receivers having at least one channel to receive said first radio broadcast signal and at least one channel to receive said second radio broadcast signal located at or near the surface of the earth.

27. A UHF radio system adapted to broadcast signals having frequencies in a range of about 300 MHZ to about 3,000 MHZ comprising:

a broadcasting source for broadcasting on a first path a first radio broadcast signal that includes audio program information on a first satellite source traveling in a substantially geosynchronous orbit;

a broadcasting source for broadcasting, on a second path, after a time delay of sufficient length to substantially eliminate said service outages, said delay being at least about 0.5 seconds, following the broadcast of said first radio broadcast signal, a second radio broadcast signal from a second satellite source traveling in said substantially geosynchronous orbit, said second satellite source and said second path being spaced from said first satellite source and said first path a predetermined number of degrees to minimize further outage and fading of said first and said second radio broadcast signals; and a plurality of mobile receivers for receiving said first and said second radio broadcast signals, each of said mobile receivers being located at or near the surface of the earth, each of said receivers being adapted to produce said radio broadcast signal as an output signal from said first and said second radio broadcast signals, each of said receivers including at least one channel to receive said first radio broadcast signal and at least one channel to receive said second radio broadcast signal, each of said receivers including means for storing said first and said second radio broadcast signals, and means for outputting said audio program with minimal interruption using portions of said first stored signal, portions of said second stored signal, or both.

28. The system of claim 27 further comprising a UHF radio receiver that includes means for measuring the signal strengths of said first and said second radio broadcast signals, and means for forming and outputting the broadcast program data from said first and said second radio broadcast signals.

29. The system of claim 27 wherein said first satellite source or said second satellite source comprises at least two separate satellites.

30. The system of claim 27 wherein said broadcasting means are adapted to broadcast said first radio broadcast signal and said second radio broadcast signal at opposite polarizations where the frequency of said first radio broadcast signal is substantially the same as the frequency of said second radio broadcast signal.

31. The system of claim 27 further comprising, in each of said receivers, means for measuring the strengths of broadcast signals from said first and second satellite sources, and means for selecting the stronger broadcast signal from said first and said second radio broadcast signals for output.

32. The system of claim 27 wherein said receiver includes means for combining said first and said second radio broadcast signals.

33. The system of claim 27 further comprising means for modulating said first and said second radio broadcast signals to reduce multipath fading.

34. The method of claim 23 or claim 24 or claim 25 or claim 26 wherein said predetermined number of degrees is in the range of about 25 degrees to about 50 degrees.

35. The method of claim 23 or claim 24 or claim 25 or claim 26 further comprising broadcasting said first radio broadcast signal and said second radio broadcast signal at opposite polarizations where the frequency of said first radio broadcast signal is substantially the same as the frequency of said second radio broadcast signal.

36. The method of claim 23 or claim 24 or claim 25 or claim 26 wherein said first satellite source or said second satellite source comprises at least two separate satellites to provide additional broadcast signal paths.

37. The method of claim 23 or claim 24 or claim 25 or claim 26 wherein said assembling step comprises selection of said first radio broadcast signal or said second radio broadcast signal for output from at least one of said receivers.

38. The method of claim 23 or claim 24 or claim 25 or claim 26 wherein said assembling step comprises combining said first radio broadcast signal and said second radio broadcast signal to produce said output signal at at least one of said receivers.

39. The method of claim 1 wherein said two radio broadcast signals are at the same frequency, and result from division of a common transmission channel into said two radio broadcast signals.

40. The method of claim 39 further comprising using digital signal multiplexing to divide said common transmission channel.

41. The method of claim 39 further comprising using analog signal multiplexing to divide said common transmission channel.

42. The mobile receiver of claim 13 or claim 14 or claim 15 or claim 16 or claim 17 or claim 18 wherein said time delay is in the range of about 1 second to about 5 minutes.

43. The method of claim 19 or claim 20 or claim 21 or claim 22 or claim 23 or claim 24 or claim 25 or claim 26 wherein said time delay is in the range of about 1 second to about 5 minutes.

44. The system of claim 27 or claim 28 or claim 29 or claim 30 or claim 31 or claim 32 or claim 33 or claim 39 or claim 40 or claim 41 wherein said time delay is in the range of about 1 second to about 5 minutes.

* * * * *